United States Patent [19]

Doering

[11] Patent Number: 4,593,849

[45] Date of Patent: Jun. 10, 1986

[54] ROTARY WELDING DEVICE

[75] Inventor: John N. Doering, Louisville, Ky.

[73] Assignee: Republic Welding Company, Louisville, Ky.

[21] Appl. No.: 653,289

[22] Filed: Sep. 24, 1984

[51] Int. Cl.⁴ .............................................. B23K 37/02
[52] U.S. Cl. .......................................... 228/29; 228/45
[58] Field of Search ........................... 228/119, 29, 45; 219/76.1, 125.1, 125.11, 125.12

[56] References Cited

U.S. PATENT DOCUMENTS

| | | | |
|---|---|---|---|
| 2,749,421 | 6/1956 | Mikulak | 219/124.22 |
| 3,543,989 | 12/1970 | Cooper | 228/45 |
| 3,665,148 | 5/1972 | Yasenchak | 228/45 |
| 3,709,423 | 1/1973 | Hano | 228/45 |
| 3,913,820 | 10/1975 | Valentine | 228/45 |
| 4,131,783 | 12/1978 | Kensrue | 219/124.31 |
| 4,215,809 | 8/1980 | Davis | 228/48 |
| 4,418,266 | 11/1983 | Rosenbeck | 219/125.1 |

Primary Examiner—Nicholas P. Godici
Assistant Examiner—G. M. Reid
Attorney, Agent, or Firm—Edward M. Steutermann

[57] ABSTRACT

A welding device for building up metal for repair or construction of a metal bores, outside diameters and circular faces by laying down single or continuous metal weld beads in a pre-selected pattern; including a base member to receive a rotatable table with a drive is provided on the base to rotate the table at selected speeds. An elongated tubular spindle is provided to rotate with the table. Conduits for welding wire, welding current (power) and a shielding gas supply is provided to the spindle to supply gas, power and wire to the area adjacent the point of exit of the wire. The tip of the spindle serves as one electrode contactor in a welding process and the metal to be welded serves as the other. The spindle rotates with movement of the rotating table where the table includes a horizontal guide member to receive a slide member which carries the spindle and the slide member is longitudinally moveable in the guide to be selectively advanced and retracted by a variable horizontal feed device also located on the rotating table and where the rotatable table further includes a rotatable threaded connecting member to receive the spindle where the outside of the spindle is threaded so that upon rotation of the connecting member the spindle is raised and lowered relative to the rotating table.

1 Claim, 16 Drawing Figures

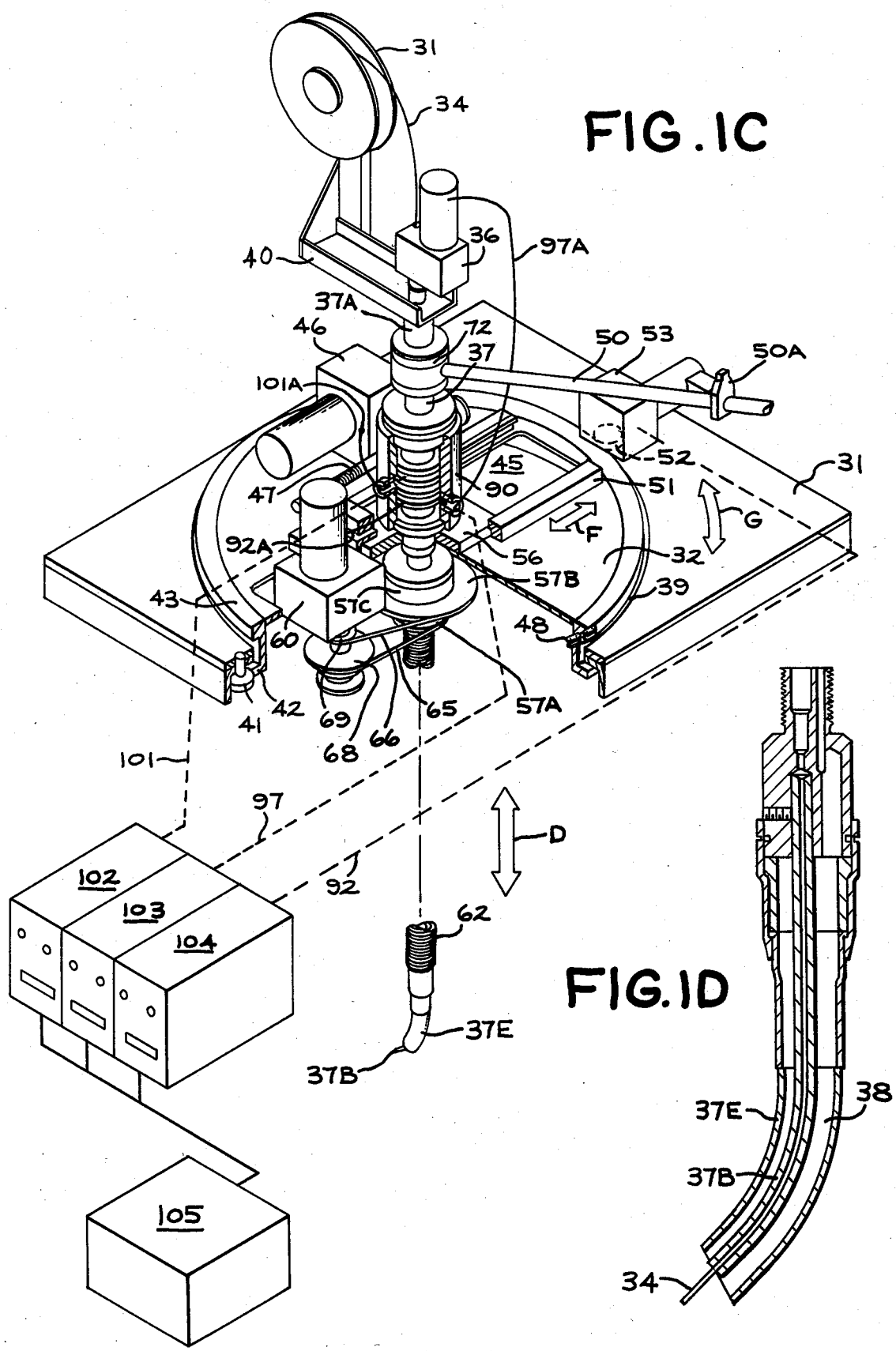

ROTARY WELDING DEVICE

BACKGROUND OF THE INVENTION

The present invention relates to devices for laying down a continuous bead of weld overlay material in a selected pattern on a metal base. Devices within the scope of the present invention find particular application as semi-automatic and automatic welding machines used for overlay welding of new metal for the repair of oversize or worn bores, undersize trunnions and worn faces of mechanical equipment.

Devices within the scope of the present invention are designed principally for welding in an indexed repetitive pattern for example a helix, continuous spiral flat mode, or adjacent straight weld beads and at angles in an included range of a vertical to horizontal postion. Likewise, in addition to continuous welding, devices within the scope of the present invention can be adapted to perform incremental welding.

While the method and apparatus of the present invention are useful in many applications, the method and apparatus is particularly useful in the repair of enlarged interal bores or worn outer cylindrical surfaces. For example, in the repair of oversize bores where the bore receives a pin and acts as a pivot, the bore wears internally so the diameter becomes too large to permit satisfactory operation of the equipment. Another example is the inside and outside diameters of cylinder walls and trunnions on hydraulic and other mechanical devices where a piston, cylinder or shaft causes wear. In such instances the prior art has generally utilized sleeving as a means of repair. However it has been found that in many instances the sleeves "coin" and fall out of the bore after a short period of reuse.

Additionally the present invention provides method and apparatus useful in overlay welding construction, for example where a carbon steel base is overlaid with another metal such as stainless steel.

The present invention provides means to replace the worn metal with metal of characteristics at least equal to the original and permits remachining of the bore substantially as it was originally.

No prior art device is known for accomplishing the objectives of the present invention for repairing bores, trunnions or/and faces, by overlay welding in a semi-automatic or automatic mode on a continuous or incremental basis in the same means as the present invention.

With the exception of robotic controlled welding (where no prior art device is known which provides means for a buildup of metal in long length bores) the prior art provides a fixed welding head and the use of rotatable welding positioners and manipulators utilized as a cooperative pairs where the devices are used in tandem to position and move the element to be welded as opposed to rotation of the welding heads as provided by device in accordance with the present invention. In such prior art arrangements the positioner holds and turns the work piece while the manipulator or welder holds and manipulates the welding torch. Present day equipment is limited by the size of the part being welded and requires parts that can be readily clamped and centered on a positioner. If the part is too large for the positioner a different arrangement must be utilized.

Additional problems are encountered in the prior art, in that balancing the work piece on the weld positioner is necessary to ensure proper welding speed and the overhanging weight of the part must not exceed the capacity of the positioner.

No prior art device is known which permits continuous repetitive indexed feed of an incremental welding bead inside or outside of cylindrical shapes or continuous spiral feed welding on flat surface, while the work piece doesn't move. Prior art equipment further cannot be used to perform incremental welding of bores that are unevenly enlarged or out of round due to excessive wear.

Two known prior art devices illustrated in FIG. 1A and 1B the accompanying drawings are manufactured respectively by the C. C. Peck Company of Cleveland, Ohio and the Bancroft Corporation of Waukesha, Wis., to provide means for welding but both have the welding head and the part exposed at an angle with respect to one another and the welding heads cannot be rotated through more than 360° nor can the heads be laterally advanced and retracted.

The prior art further includes various patents which relate to rotatable type welding equipment but none of which teach the features of the present invention. The references include Valentine, U.S. Pat. No. 3,913,820; Yasenchak, U.S. Pat. No. 3,665,148; Mikulak, U.S. Pat. No. 2,749,421; Cooper, U.S. Pat. No. 3,543,989; Kemsure, U.S. Pat. No 4,131,783; and Massakihano, U.S. Pat. No. 3,709,423.

SUMMARY OF THE INVENTION

The present invention provides new and useful welding methods and arrangements which can be utilized in welding overlying new metal to existing base metals. In one example the method and apparatus of the present invention is utilized in gas metal arc welding such as a gas shielded arc welding processes in which the welding heat is obtained from an electric arc between a consumable electrode called a filler wire and a grounded work piece. The filler wire is melted in the inert gas atmosphere and is transfered to the work surface, the joint, or other welding area where it is desired to build up welding metal. The arc provides sufficient heat to fuse the filler wire and to alloy it with the work surface or the joint metal. The molten weld puddle is protected from the atmosphere during the welding operation by the gas, which is an inert gas, otherwise atmospheric oxygen and nitrogen would combine with the molten weld metal leaving the weld porous and weak. In general, a filler wire is utilized having physical properties at least equal to or stronger then the work piece so that the repaired area is not weakened. While the present invention is described herein with reference to the gas metal arc welding process the method and apparatus of the present invention are equally useful in other welding methods such as gas tungsten arc welding, and plasma arc welding or other welding processes and filler metals such as fluxcore and fabricated wires. Devices within the scope of the present invention are useful, in general, in over-laying metal surfaces to be repaired. The devices further can be utilized for filling wear spots in inside diameter bores, either continuously or incrementally, trunion welding, welding on outside diameter, either continuously or incrementally, face welding on the top, bottom or sides and in a spiral in and spiral out mode on top, bottom or sides. Single or multiple bead welding can be accomplished in the vertical or up/down mode inside or outside of bores or other geometric shapes. It will be understood that the present invention can be utilized to overlay metal in repair, or in new manufacture, and while the invention is described hereinafter in reference to inside welding of bores the invention is not limited thereto.

Likewise single and multiple bead welding can be accomplished in vertical or up/down mode on the outside diameters of cylinders or other circular shapes as well as single bead welding on flat, angular, or radial surfaces or inside or outside or circular shapes.

Further, devices within the scope of the present invention are portable so a positioner device is not required to hold the part to be repaired so the welding device can be moved to the repair sight to repair large pieces of equipment which would be difficult to move and, in many instances, too large to be placed on a positioner as required by the prior art.

Briefly the present invention provides a welding device for building up metal for repair or construction of a metal bore by laying down a metal weld bead in a selected pattern; including a base member to receive a rotatable table with a drive is provided on the base to rotate the table at selected speeds. An elongated tubular spindle is provided to rotate with the table. Welding wire and a gas supply is provided to the spindle to supply gas and wire to the area adjacent the point of exit of the wire. The tip of the spindle which may be a consumable welding wire serves as one electrode in a welding process and the metal to be welded serves as the other. The spindle rotates with movement of the rotating table where the table includes a guide member to receive a slide member which carries the spindle and the slide member is longitudinally moveable in the guide and is on laterally moveable to be selectively advanced and retracted by a horizontal feed drive motor also located on the rotating table and where the rotatable table further includes a rotatable threaded connecting member to receive the spindle where the outside of the spindle is threaded so that upon rotation of the connecting member the spindle is raised and lowered relative to the rotating table.

It will be understood that various arrangements within the scope of the present invention will occur to those skilled in the art upon reading the disclosure set forth hereinafter and that the disclosure setforth hereinafter with reference to accompanying drawings is not by way of limitations.

BRIEF DESCRIPTION OF THE DRAWINGS

Examples of the prior art and examples of the present invention are illustrated in the accompanying drawings wherein:

FIG. 1C is a perspective view of an example of one arrangement within the scope of the present invention;

DETAILED DESCRIPTION OF THE DRAWINGS

Figure 1A:
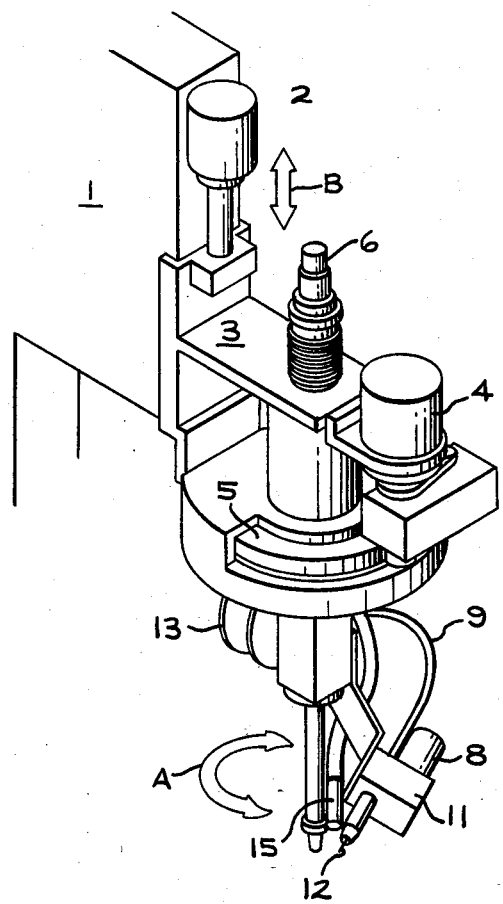
FIG. 1A is an example of known prior art.
Figure 4:
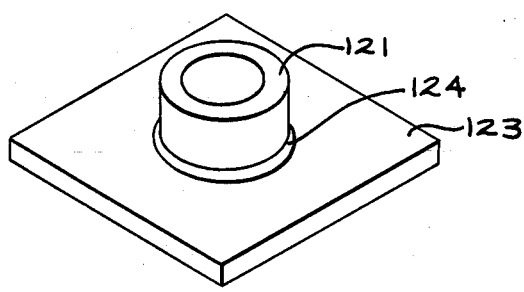
FIG. 4 illustrates one example of applications for use of devices within the scope of the present invention for providing weld beads at joints.

FIG. 1A is an illustration of one example of a prior art device manufactured by the C. C. Peck Company wherein a base 1 is provided which carries a drive 2 to raise and lower a bracket 3 which carries drive motor 4 to rotate a welding column 6 in the directions shown by arrow A. Welding column 6 is provided with a wheel 5 which is connected to the column and rotated by a drive mechanism 4 connected to the bracket 3 to rotate the welding system. A reel 13 is provided to supply welding wire 9 to a feeder head 11 driven by a motor 8 to provide welding wire at a tip 12. A tube 15 is provided as shown to supply inert gas. The welding assembly including column 6 which can be moved up and down in rapid traverse positioning only to facilitate loading and unloading of parts to be welded as indicated by arrow B by drive 2. The device as shown can only preform joint welding as shown in FIG. 4. Further the welding head cannot be advanced into the bore and no provision is made for lateral adjustment of position of the welding column 6 as provided in the present invention as described hereinafter.

Figure 1B:
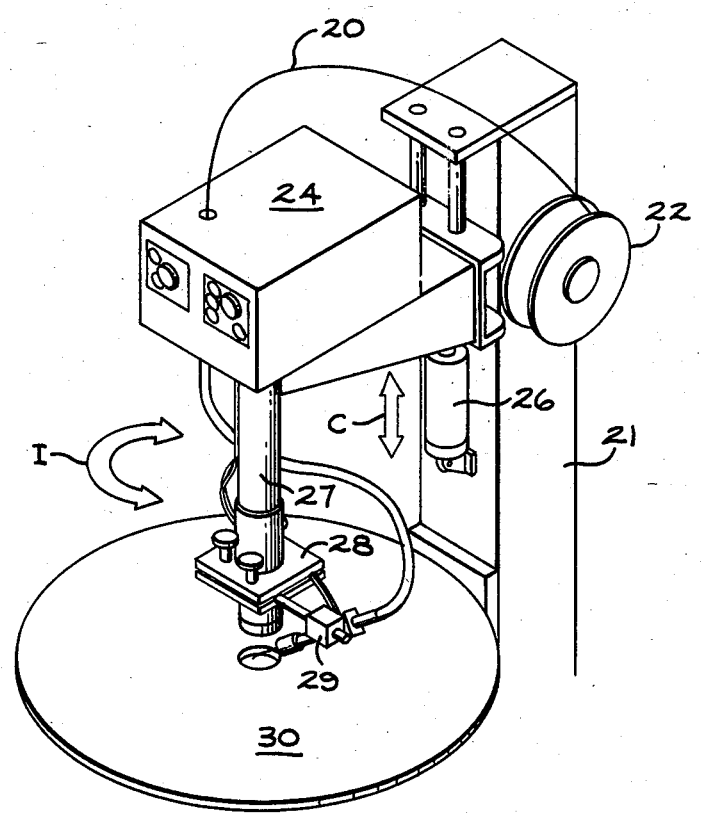
FIG. 1B is an example of known prior art.

FIG. 1B is an illustration of a type of equipment manufactured by Bancroft Corp. where a stationary column 21 is provided having a wire feed spool 22 to feed wire 20 to controller 24 which controls the operation of the device and likewise controls the rate of feed of the wire 20. Controller 24 is mounted on a bracket 23 which is moved up and down in rapid traverse to facilitate loading and unloading of parts to be welded, as shown by arrow C by means of a hydraulic cylinder 26 where a welding assembly column 27 is provided from controller 24 extending downwardly to a welding head positioner 28 which holds an electrode feed device 29 above a plate 30 where plate 30 can be rotated as indicated by arrow I to weld the work but the column cannot be moved laterally.

FIG. 1C is an illustration in partially cut away perspective, of one arrangement within the scope of the present invention.

Figure 2:
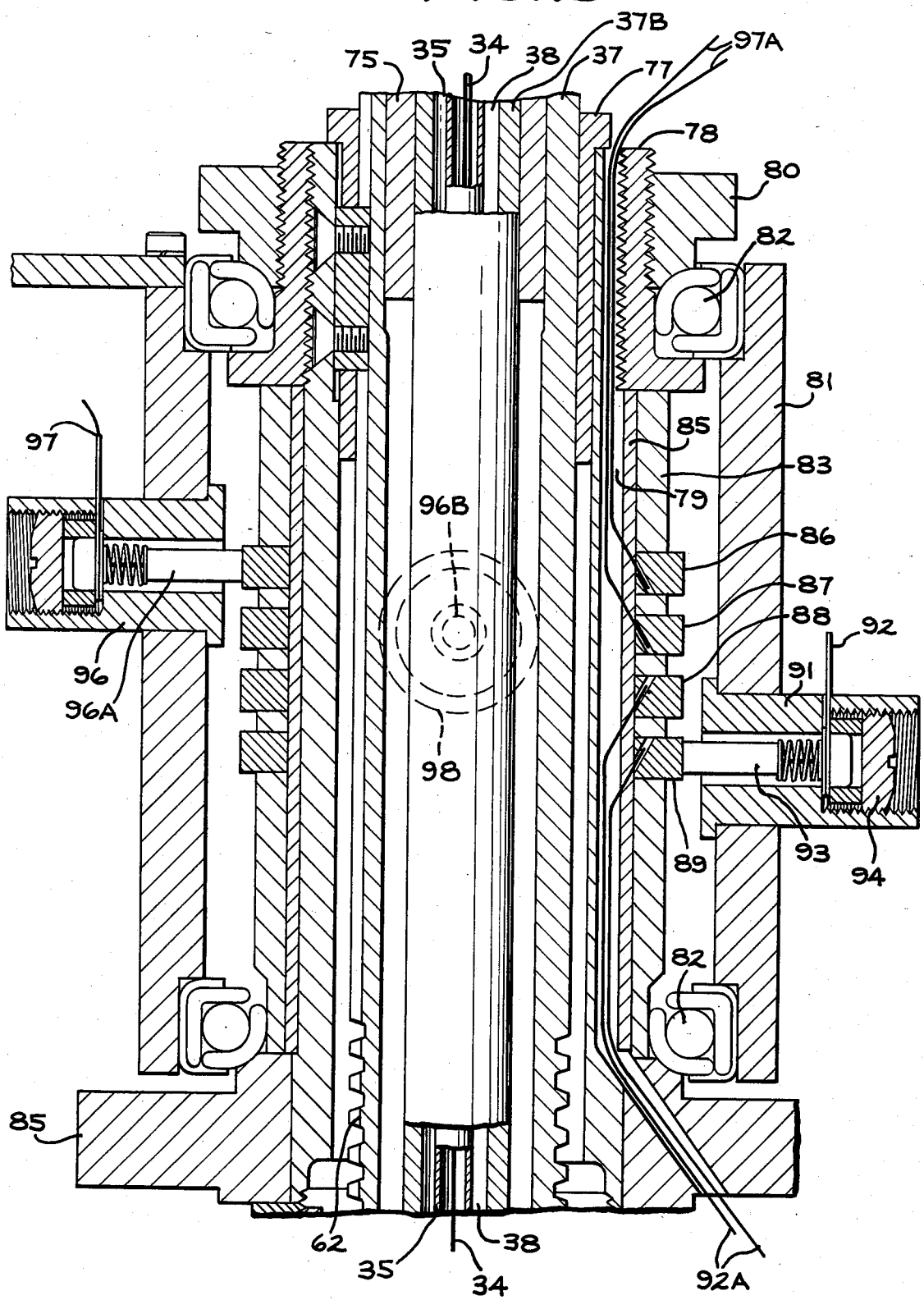
FIG. 2 is a view in cross section of the electrical slip ring assembly in the arrangement shown in FIG. 1C.

A feed reel 31 is provided to feed wire 34 where reel 31 is carried on a bracket 40 which is connected to a column which carries a rotory joint shaft coupling 72. A fixed table 31 is provided and is carried by a radial arms 111 shown in FIG. 3. Column 37 can, for example be a thick walled steel supporting tube to provide support for the rotating assembly described hereinafter and can be provided with a hollow copper pipe buss 37B and an inner conduit 35 to receive electrode wire 34 as shown in FIG. 2. Inert gas, as described hereinafter with reference to FIG. 2, is supplied through annular passage 38 between buss 37B and conduit 35 from rotary coupling 72. A rotary table 32 is provided in an aperture 39 of table 31 where table 32 is carried by and rotated in, spaced rollers 41 which support and guide a lip 42 of table 32 as shown. Table 32 can have a second lip 43 to pass thru aperture 39 as shown.

A chain 48 secured to lip 43 is provided in sprocket teeth (not shown) around the periphery of table 32 where chain 48 is driven by a sprocket 52 driven by a bidirectional drive motor 53 to rotate table 32 at selected speeds depending on the character of the material to be welded. The drive 53 is located on the fixed table 31 and does not rotate with the rotary table 32.

A cross slide 56 is provided to be received in guides 51 extending diametrically across table 32 adjacent an opening 45 in the center of table 32, as shown, to permit lateral movement of the slide which carries the welding assembly described herein. Column 37 is journaled on slide 56 by means of a nut assembly (not shown) in head 57C which is operated by first and second sprockets 57A, 57B, where the nut assembly receives threaded surface 62 of shaft 37 to facilitate vertical movement of shaft 37. Referring to FIG. 1C sprockets 57A, 57B, are of different diameters and receive chains 65, 66 driven by likewise different diameter sprockets 68, 69 driven by a drive 60. The differential in the rate of rotation of the sprockets 57A, 57B because of the difference in diameter of the sprockets 57A, 57B and sprockets 68, 69 causes rotation the two sections of the nut assembly to raise and lower column 37 to cause vertical movement of the assembly at selected speed to provide a weld, of selected spacing in response to the direction of rotation as indicated by arrow D of FIG. 1C. Slide 56 which carries shaft 37 can also be moved bidirectionally as shown by arrow F by means of a lead screw 47 which is driven by drive 46 and engages a connecting nut (not shown) to move slide 56 bidirectionally as desired as shown by arrow F in response to rotation of drive 46. Drive 46 is carried for rotation with table 32 so that the welding column 37 can be advanced or retracted in the directions shown by arrow F during the rotation of table 32.

Referring again to FIG. 1C a wire feed drive 36 is provided to supply electrode wire 34 from reel 31 through tube 35 carried within column 37 to an outlet contact tip 37B, as shown in FIGS. 1C and 2. Referring again to FIG. 1C, the gas from inlet 50 of FIG. 1C flows through annular passage 38, as shown in FIG. 2. Inlet tube 50 (FIG. 1C) can be connected column 37 by a rotary joint 72 which allows inert welding gas to flow to the annular conduit 38 (FIG. 2) defined between buss shaft tube 35, and buss tube 37B, so that the gas is emitted adjacent the wire feed. Buss tube 37B also serves to conduct electrical power to contact tip 37B by means of electrical connector 50A (FIG. 1C) which is connected to a source of electrical power supply (not shown) to provide one electrode where the metal being welded serves as the electrode of opposite polarity.

As previously described table 32 is driven by means of drive 53 which is carried on table 31 so that actuation of drive 53 rotates table 32 shown by arrow G for rotational movement and, where desired, multiple rotations not permitted by prior art or in a reciprocatory motion as described hereinafter to allow incremental welding.

Operating power for the drive 60, which drives the vertical feed sprockets 68-69, the drive 46 which drives the lead screw 47 for lateral movement of slide member 56, and drive 36 which supplies the feed wire, is supplied through a slip ring assembly 90, details of which are shown in FIG. 2. Connections 101, 97, 92 are supplied from variable direct current power supplies 102, 103, 104 as shown where the power supplies are carried by a bracket on permanent table 31 to the slip rings so that the current can be supplied to the drives previously described while they are rotating on table 32.

In FIG. 2, the leads 92 and 97 are shown, in diametrically opposed relation, connected to brush assemblies 91 and 96 where, with reference to brush assembly 91, lead 92 is retained by a plastic insulating screw 94 located therein and a brush 93 is supplied to contact a slip ring 89 which rotates with shaft 37. An identical arrangement is provided with respect to brush assembly 96 where a brush 96A is provided to contact a slip ring 86. Slip rings 87 and 88 are also provided, slip rings 86 and 87 will be utilized to supply current to drive 36 and slip ring 88 and 89 will be utilized to operate drives 46 or 60 alternatively by means of switching from one to the other since they are not used simultaneously. It will be understood that brush assemblies similar to assemblies 91 and 96 are provided in the slip ring assembly 90 for power take offs to all drive members, previously described. As far as the assembly 90 is concerned in FIG. 2 shaft 37 is illustrated extending longitudinally there through with an internal copper buss tube 37B located inwardly therefrom defining an annular area 38 where the gas from rotating connecter 72, shown in FIG. 1C, flows. Wire 34 is located internally of tube 35 and extends through the tube to the contact tip 37B where electrode wire 34 is emitted from tip 37B.

With reference to FIG. 2, member 75 insulates the buss tube 37B from the grounded column 37. A similar insulator is located at the bottom column 37. These insulators prevent electrical shortening of the welding power.

A tubular housing member 79 and bronze bushing 77, control the shaft 37 vertical guidance up and down. Feed nut (not shown) at the bottom located in FIG. 1C, 57C provides stability for shaft 37 at the bottom. Nut 78, retains electrical tubular sleeve insulators 85, insulator sleeve segments 83, and copper slip rings 86, 87, 88, and 89. Nut 78 also provides a journal for bearing 82 and bearing retainer nut 80. Bearing 82 in turn provides a journal for outer stationary brush housing 81. Tubular housing member 79 is grooved vertically to allow electrical wires 92 and 97 that are soldered to slip rings 86, 87, 88 and 89 conducted from the top and bottom of 79. These wires provide electrical power to rotory drives 46, 60 and 36.

Assembly 90 is utilized to distribute power for operation of the drives 60, 46 and 36 by means of slip rings while the table 32 is rotating to allow multiple turns of the welding column 37 to facilitate the overlapping and repetitive welding patterns described by the head 38 as described hereinafter. As shown in FIG. 1C power is distributed from slip ring assembly 90 to the drives, for example lead 97A which extends from slip ring assembly 90 to the wire feed assembly drive 36 illustrating that power input 97 from power supply 103 which operates the wire feed 36 (FIG. 1C) is connected to the slip ring assembly 90 (FIG. 2). Also as shown conducter 92A extends from to slip ring assembly 90 drive 46 and 60 alternatively where operation of drive 50 is controlled by power supply 104.

It will be understood that drive 53, 60, 46 and 36 can be operated by a programmable controller 105 which can be programmed to rotate table 32 at selected speeds or to cause table 32 to reciprocate in selected sequence for incremental welding. Additionally the controller 105 initiates and terminates welding power, as well as any shielding gas at precise and controlled intervals.

Figure 3:
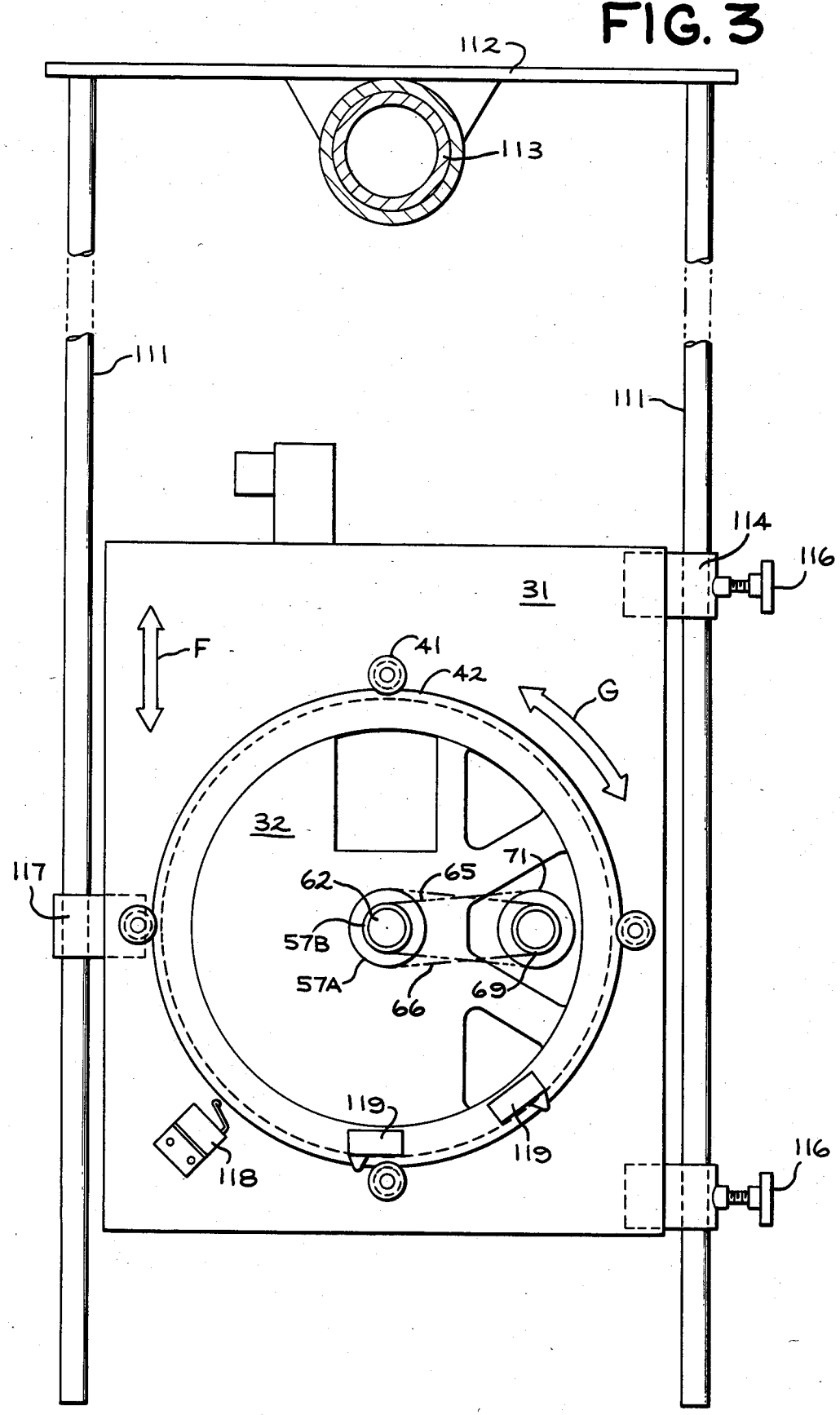
FIG. 3 is a bottom side view of the device shown in FIG. 1C.

FIG. 3 is an illustration of a bottom view of the assembly shown in FIG. 1C where the table 31 is shown carried by radial arms 111 extending outwardly from a base plate 112 which is carried by a column 113. The table 31 is retained by means of slide clamps 114 which can be provided with handles 116 and a third slide clamp 117 provided on opposite arm 111 so that the table 31 can be moved radially with respect to arrow A and circumstantially with respect to column 113, arrow B for positioning where desired. The entire assembly affixed to member 112 can be mechanically raised or lowered for positioning to and desired height within the height of column 113. Rollers 41 are shown receiving the lip 42 of table 32 and, as shown, a limit switches 118 can be provided to be engaged by dogs 119 carried in space relation on the underside of table 32. The dogs 119 can be used for incremental welding and can be spaced apart a distance equal generally to the arc of travel to be welded where sequential engagement of the dogs 119 with limit switch 118, is supplied to DC power supply 104 to cause reversal of drive member 53 and so that table 32 can oscillate back and forth along the arc of the area to be welded. Where desired, slide member 56 can be withdrawn or moved outwardly as the case may be depending on whether the welding is internal or external, to supply the overlaying layers of weld. Also, an electronic pulse counter can be used instead of dogs 119 and limit switches 118 if desired.

A programmable controller (not shown) can be programmed to accomplish a selected task in automatic mode where the various drives 36, 46, 60 and 53 are sequentially actuated to provide a weld, for example, of selected length, of selected number of overlaying layers, and of selected depth so that entirely automatic welding can be accomplished. The controls turn on and off the welding power, the wire feed, and the shielding gas.

FIG. 4 is an illustration of one application of a device within the scope of the present invention where a nipple 121 is welded to a base 123 by means of an annular weld 124 which can be performed by a device within the scope of the present invention.

Figure 5:
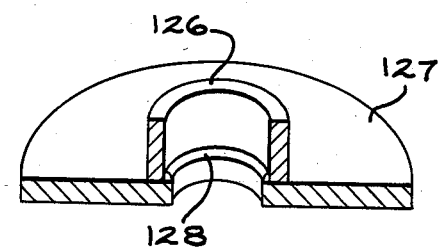
FIG. 5 illustrates another application for use of devices within the scope of the present invention for providing weld beads at joints.

FIG. 5 is an illustration of another arrangement where nipple 126 is welded to 127 by means of an internal weld 128 accomplished by a device within the scope of the present invention. A combination of weld joints, internal and external, may be accomplished if needed.

Figure 6B:
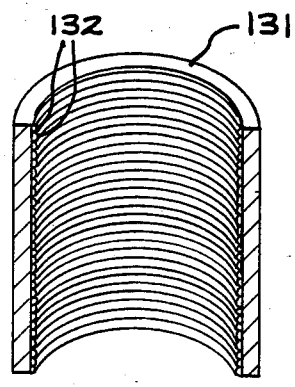
FIG. 6B is an example of a repair weld which could be provide by the track weld illustrated in FIG. 6A.
Figure 6A:
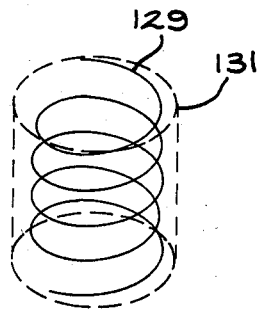
FIG. 6A is a track diagram of the movement of a welding bead in one example within the scope of the present invention for providing a continuous helical weld bead for the inside of a bore.

FIG. 6A is an illustration of a tract 129 which is helical in nature and is demonstrative of the path which would be followed by the tip 38 of the welding device in welding a helical pattern inside a element 131 as shown in FIG. 6B where the element 131 is shown and the overlaying welds 132 are likewise illustrated.

Figure 7B:
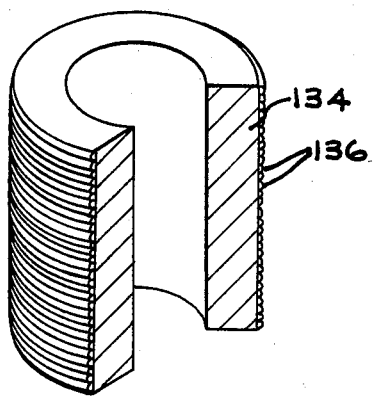
FIG. 7B is a illustration of a repair of the outside of a cylindrical shape by a device within the scope of the present invention.
Figure 7A:
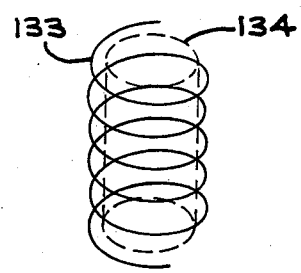
FIG. 7A is an example of a welding bead track utilized in connection with the repair illustrate in FIG. 7B.

FIG. 7A illustrates the track 133 followed by the welding head 34 in making an external cylindrical weld on an element 134. The element 134 is shown in FIG. 7B as is the weld pattern 136.

Figure 8B:
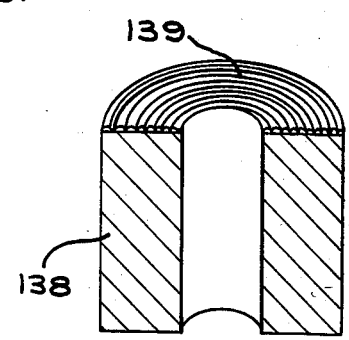
FIG. 8B is a illustration of a multiple weld weldment in a flat surface within the scope of the present invention.
Figure 8A:
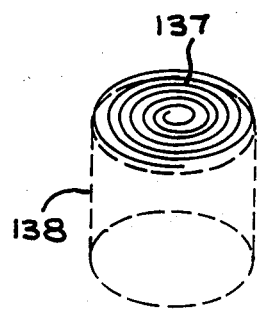
FIG. 8A is an illustration of a weld track for repair of a flat surface.

FIG. 8A is an illustration of the spiral pattern 137 which would be followed in overlaying weld surface on an element 138 where the element 138 is shown in FIG. 8B and the weld 139 is likewise shown.

In operation, the work piece setups are greatly simplified and setup time is greatly minimized. Unlike welding done on a prior art device where a postioner is utilized and the work piece must be clamped down and aligned with the axis of the postioner the devices within the scope of the present invention eliminate these steps, in that the work pieces do not have to be clamped down because the weight of the part is generally sufficient to retain the part because there is no force exerted on the part. Precise alignment of the work piece is not required since the device within the scope of the present invention, particularly where it is carried on radial arms 111 as previously described can be quickly aligned to the work piece. Further the parts which have been precluded from use on weld postioners because of size present no problem in use of devices within the scope of the present invention since the weight of the part does not affect or inhibit setup time since all of the parts to be worked on rest on the floor or the table. The welding accomplished by the device within the scope of the present invention can be accomplished principally in the automatic mode while welding utilized in prior art postioners are either manual or semi automatic and never automatic.

Devices within the scope of the present invention are particularly useful to repair badly worn elongated holes where the holes normally wear in the direction of the load depart supports in service and the wear is generally never consistant from part to part. In order to restore the machining stock with weld filler more weld filler must be utilized on the portion of having the greatest wear. The incremental welding mode allowed by the present invention as previously described in combination with the subsequent use of full circle welding allows the operator to initiate welding in the area in most need of repair by incremental welding by use of the dogs 119 or pulse counters (not shown) previously described and then to extend the welding to the full circle for subsequent machining and repair. Further, each weld layed down by the device within the scope of the present invention in incremental mode because of the ability to move the welding head laterally, may be wider than the proceeding layer to ensure sufficient stock available when the bore is remachined to its correct location thus the width of the pad or increment of weld can be determined by the distance between the trip dogs or alternatively the teeth or the table drive chain can be counted by an inductive pulse counter switch and a programable computer 105 can be adapted to control the drive mechanism to regularly widen the area of the incremental weld. Thus the direction and width of the increment or pad can be determined by the location of the two trip dogs or the point on the machining table when counting of the chain lengths or sprocket teeth begins relative to the work piece.

The welding sequence provided is that after alignment of the machine to the work piece center line the trip dogs are located manually or the counting sequence is set for the direction and width of the pad. Welding is then initiated at a line where the pad starts and the rotating table 32 turns with welding until it reaches the second trip dog, or a count of a given number of teeth on the rotary table depending upon which method is used. At this point the welding and rotary table stops and the upfeed controller 102 indexes the column 37 an appropriate distance where the distance is determined by counting the teeth of the sprocket gear on the motor 60. The count is then fed back to the programmable controller 105 which has been preset for a given number of pulses or counts and when the count is reached the motors 60 is automatically turned off by the computer and initiates the welding by reversing the direction of the rotary table. In this method one bead of weld is laid down on top of each other all the way up the side of the wall of the bore until the operator turns off the machine. As the elongation of the bore is being rounded by progressively wider and wider pads the point is reached when one or more complete overlays of weld filler material is laid down on the entire bore without using the incremental features.

Figure 9:
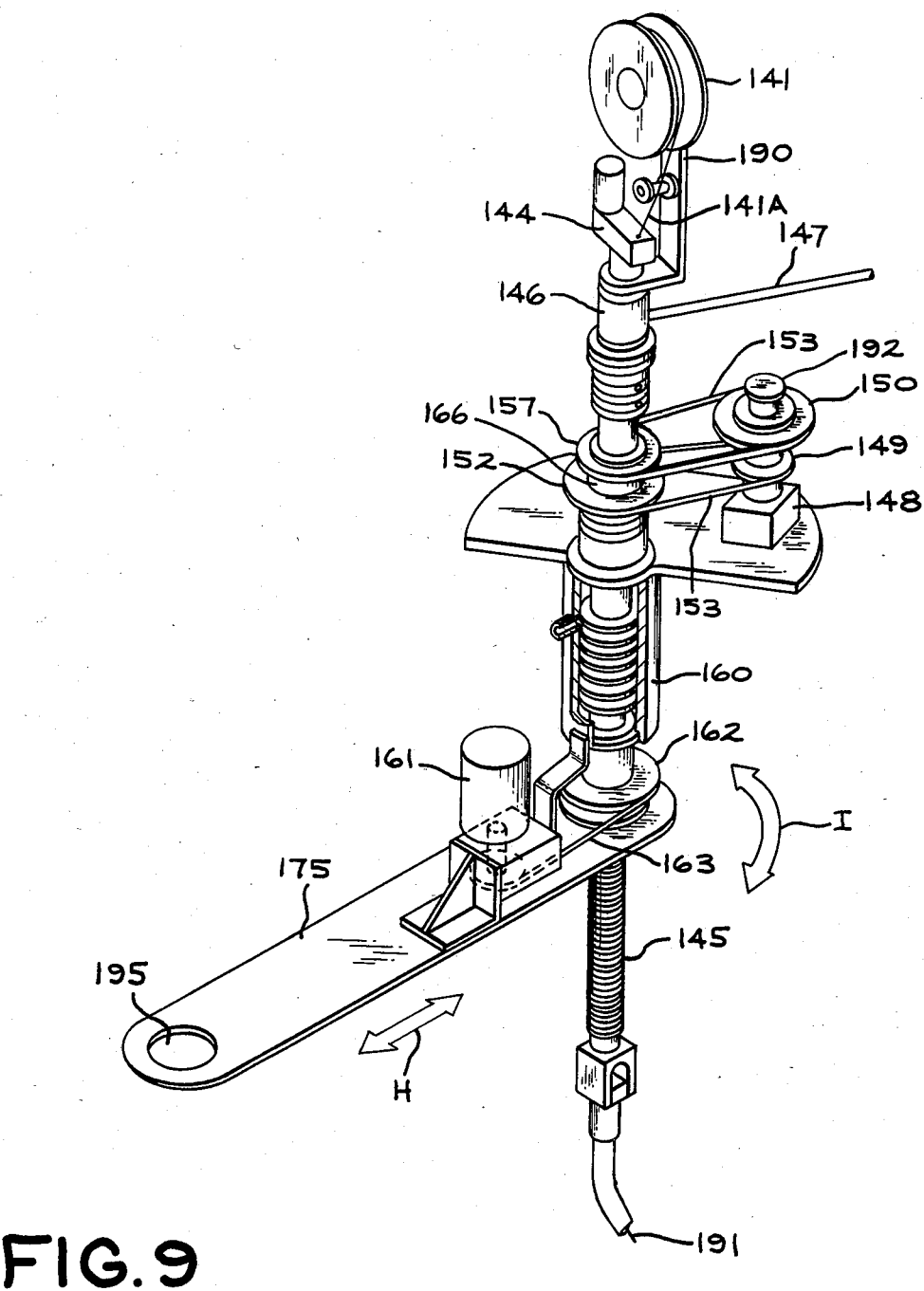
FIG. 9 is a perspective view of another arrangement within the scope of the present invention.

A second arrangement within the scope of the present invention is illustrated in FIG. 9 where a wire spool 141 is provided to a column 145 similar to column 37 of the arrangement of FIG. 1C. A wire 141A is provided to a feed device 144 which supplies the wire downwardly through the center of the column 145. A rotary connecter 146 is provided connected to a gas and power feed tube 147 to supply gas and power downwardly through the column as previously described. A vertical drive 148 is provided to drive pulleys 149, 150 which have different diameter as previously described with reference to the sprockets 69, 71, as illustrated in FIG. 1C. Cooperative sprockets 152, 157 are located on column 145 where chains 153, 154 are provided to be driven by sprockets 149, 150 of drive 148 at different angular rotational speeds as previously described to operate feed nut assembly 166 similar to feed nut assembly of FIG. 1C to selectively raise and lower column 145. Also, a clutch assembly can be provided to engage one or the other of the sprockets 149, 150.

Figure 10:
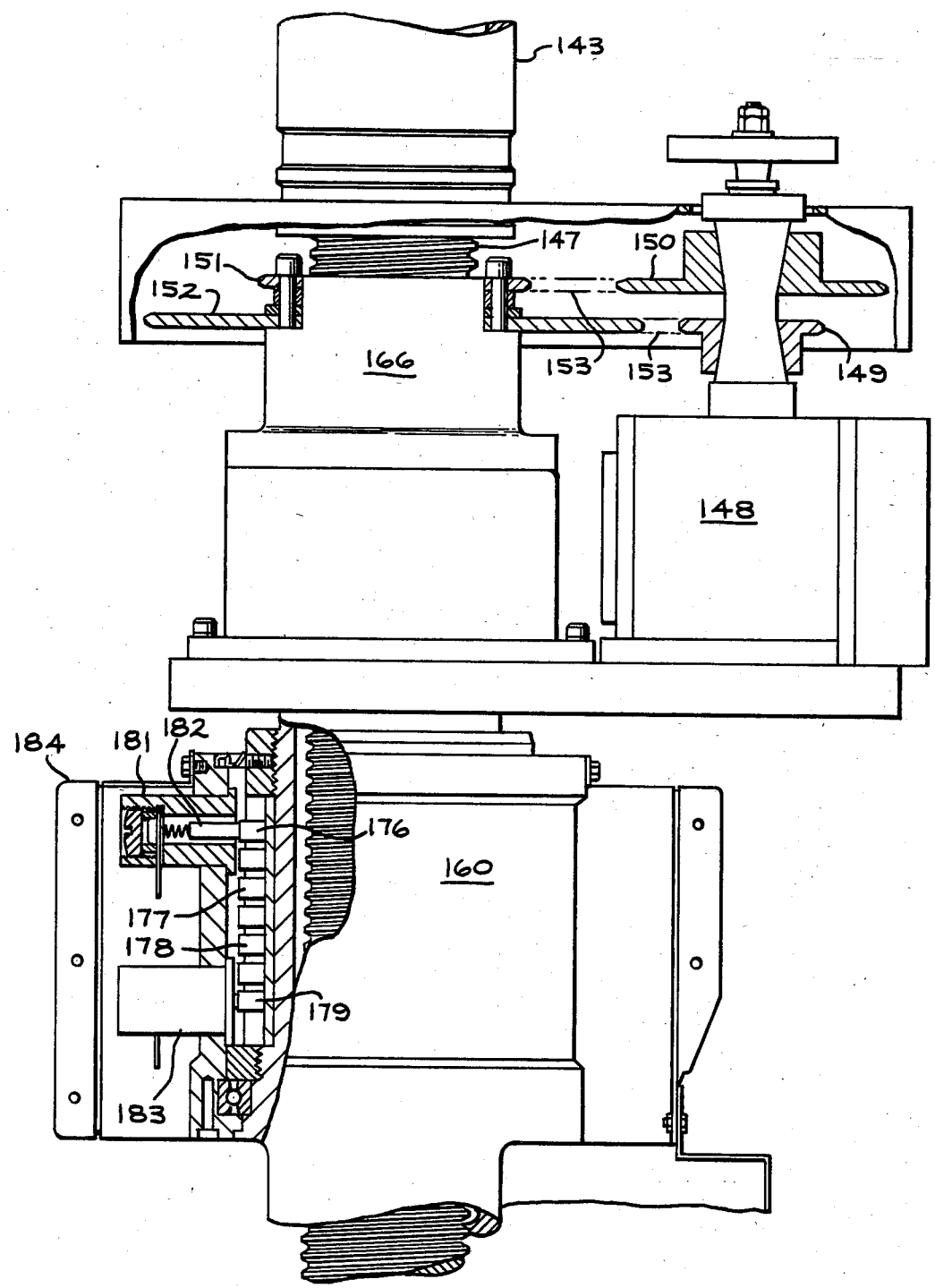
FIG. 10 is an elevational view partially in section of the vertical drive and slip ring of the device shown in FIG. 9.

Slip ring assembly 160 similar to slip ring assembly 90 is provided to receive and supply the power to the drives 148 and 144 as described with reference to Slip ring 90 of FIG. 1C, as shown in FIG. 9. A rotary drive motor 161 is provided to drive a sprocket 162 by means of a chain 163 as previously described with reference to FIG. 1C. The entire assembly is carried by an arm 175 which can be moved laterally and rotated about a pivot 191 as illustrated by arrows H and I to accomplish the objectives of locating the device. FIG. 10 is an elevational view, in section, of a portion of the arrangement shown in FIG. 9 where column 145 is shown as threaded. A segment of the slip ring assembly 160 is shown where electically conductive slip rings 176-179 are shown as is a brush assembly 181 with a brush 182 to engage, for example, slip ring 176 all as previously described with reference to FIG. 1C and FIG. 2. A second brush assembly 183 is shown to illustrate that there are one brush for each slip ring, it being understood that only a portion of the assembly is shown. In the arrangement shown the brushes are enclosed in a protective box 184 to prevent electrical shocks and electrical shortcircuits. It will be understood that a tip assembly as shown in FIG. 1C can be provided where welding wire 141A extends outwardly.

It will be understood that the foregoing are examples of devices within the scope of the present invention and that other arrangements also within the scope of the present invention will occur to those skilled in the art upon reading the disclosure set forth hereinbefore.

The invention claimed is:

1. A welding device for building up metal by laying down a metal weld bead on a base metal in a selected pattern including: a base member to receive a rotatable table; drive means on the base to rotate the table at selected speeds; elongate tubular spindle means to rotate with the table, electrical buss, welding wire supply means and gas supply means to said spindle to supply gas and wire to the area adjacent the point of exit of said wire form said spindle where said tip of said spindle serves as one electrode in a welding process and said base metal serves as the other so said spindle rotates with movement of said rotating table where said table further includes guide means to receive a slide member which carries said spindle whereby said slide member can be longitudinally moveable in said guide to be selectively advanced and retracted; horizonal feed means also located on said rotating table to advance and retract said slide where said rotatable table further includes rotatable threaded connecting member to receive said spindle where the outside surface of said spindle is threaded so that upon rotation of said connecting member said spindle is raised and lowered relative to said rotating table.

* * * * *